US011779157B2

(12) United States Patent
Verbrugge et al.

(10) Patent No.: US 11,779,157 B2
(45) Date of Patent: Oct. 10, 2023

(54) CHOPPER BLADE ASSEMBLY

(71) Applicant: Dart Industries Inc., Orlando, FL (US)

(72) Inventors: Steven J. Verbrugge, Ghent (BE); Junyu Ye, Leuven (BE); Johan Carrette, Brussels (BE); Sander Schelfout, Aalst (BE); Dimitri M. C. J. Backaert, Moorsel (BE)

(73) Assignee: Dart Industries Inc., Orlando, FL (US)

( * ) Notice: Subject to any disclaimer, the term of this patent is extended or adjusted under 35 U.S.C. 154(b) by 243 days.

(21) Appl. No.: 17/153,152

(22) Filed: Jan. 20, 2021

(65) Prior Publication Data
US 2022/0225830 A1    Jul. 21, 2022

(51) Int. Cl.
*A47J 43/044* (2006.01)
*A47J 43/07* (2006.01)
*A47J 43/08* (2006.01)

(52) U.S. Cl.
CPC ......... *A47J 43/044* (2013.01); *A47J 43/0705* (2013.01); *A47J 43/082* (2013.01); *A47J 2043/0449* (2013.01); *A47J 2043/04427* (2013.01); *A47J 2043/04436* (2013.01)

(58) Field of Classification Search
CPC .. A47J 43/044; A47J 43/0711; A47J 43/0705; A47J 2043/04409; A47J 2043/04427; A47J 2043/04436; A47J 2043/0449
See application file for complete search history.

(56) References Cited

U.S. PATENT DOCUMENTS

| 4,817,878 A * | 4/1989 | Shibata | A47J 43/046 403/349 |
|---|---|---|---|
| D614,457 S | 4/2010 | Jossem et al. | |
| 2001/0022139 A1* | 9/2001 | Kubicko | B01F 35/22142 366/279 |
| 2005/0162973 A1* | 7/2005 | Katz | A47J 43/0711 366/205 |
| 2012/0080549 A1* | 4/2012 | Rukavina | B01F 27/112 241/282.1 |
| 2015/0216359 A1* | 8/2015 | Schuette | B01F 35/512 241/282.1 |
| 2019/0224635 A1* | 7/2019 | Kent | A47J 43/06 |
| 2020/0375402 A1* | 12/2020 | Krivos | A47J 43/046 |

* cited by examiner

*Primary Examiner* — Bobby Yeonjin Kim
(74) *Attorney, Agent, or Firm* — Taylor J. Ross

(57) ABSTRACT

A food chopper blade column for use in a food chopper having a receptacle and cover. The column will be rotated in a cutting direction within the chopper during use, and mounts a plurality of cantilevered blades spaced circumferentially about the column. The upper blades include a leading edge having a single bevel cutting edge on their lower face, as well as trailing edge which is angled downward. The lowermost blade includes a leading edge having a single bevel cutting edge on its upper face, and a flat trailing edge.

4 Claims, 4 Drawing Sheets

CHOPPER BLADE ASSEMBLY

CROSS REFERENCE TO RELATED APPLICATIONS

This application is related to co-pending attorney reference number 132090-D200, which is incorporated by reference herein.

STATEMENT REGARDING FEDERALLY SPONSORED RESEARCH

Not applicable.

BACKGROUND OF THE INVENTION

The present invention relates in general to household food choppers.

It is well known to provide food choppers for home use. These choppers are distinct from blenders, in that the food is cut into relatively small pieces rather than rendered into a puree or viscous liquid. While electric versions are available, it is also well known for these choppers to be operated manually as by a crank as in USD530995, or manually as by a pull cord as in USD614457, both to the current applicant. These choppers are typically used to chop tomatoes, onions, carrots, and the like into smaller pieces, such as for salsa.

SUMMARY OF THE INVENTION

An object of the present invention is to provide a food chopper having improved chopping.

Another object of the present invention is to provide a food chopper with an improved blade column providing improved chopping.

A further object of the present invention is to provide a food chopper blade column where the upper blades tend to force the food downward toward additional cutting blades.

These and other objects are achieved by a food chopper blade column. The column will be rotated in a cutting direction within the chopper during use, and mounts a plurality of cantilevered blades spaced circumferentially about the column. The upper blades include a leading edge having a single bevel cutting edge on their lower face, as well as trailing edge which is angled downward. The lowermost blade includes a leading edge having a single bevel cutting edge on its upper face, and a flat trailing edge.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
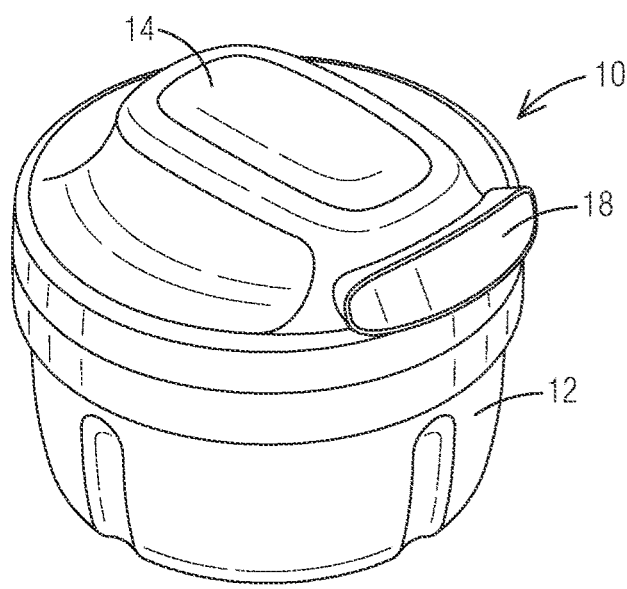
FIG. 1 is a top perspective view of a food chopper employing a blade column according to the present invention in the operative configuration.
Figure 2:
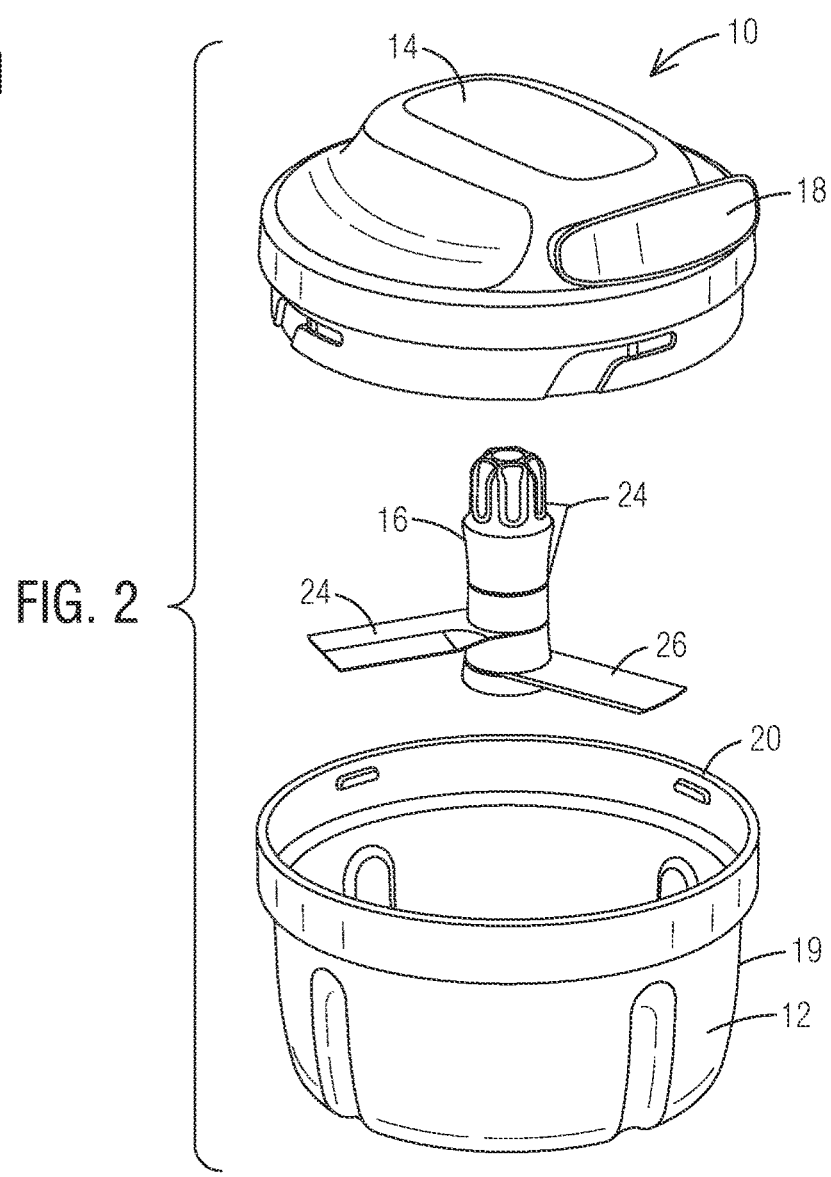
FIG. 2 is an exploded top perspective view of the food chopper of FIG. 1.
Figure 3:
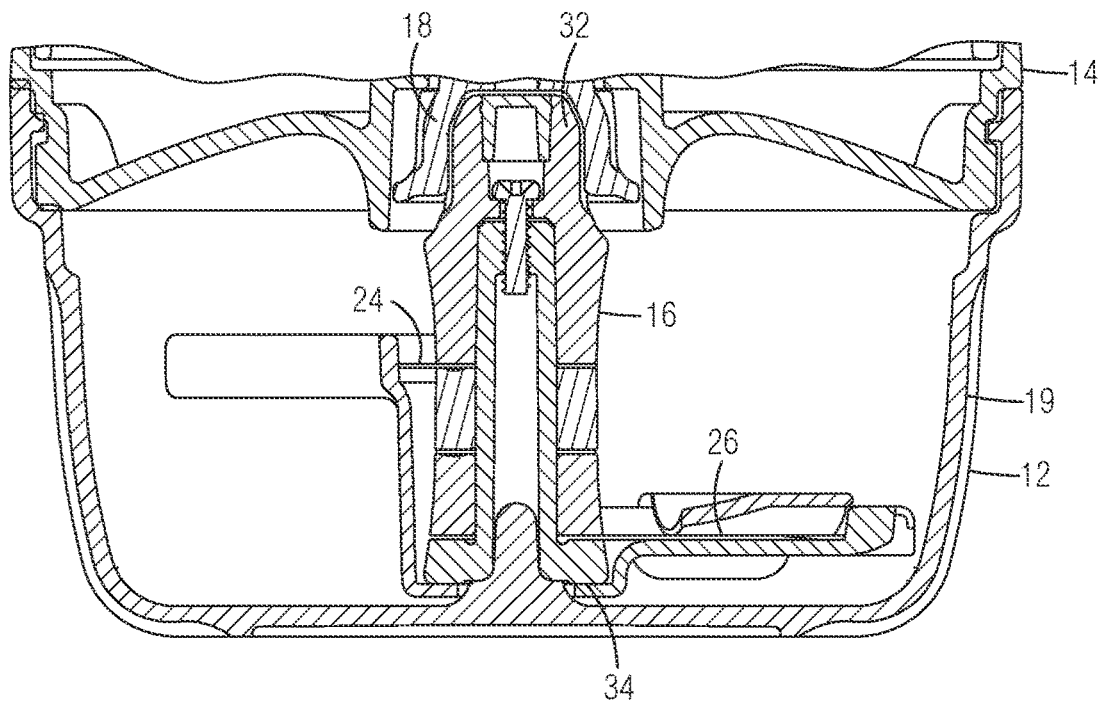
FIG. 3 is a side cross-sectional view along line 3-3 of FIG. 1.

With reference to FIG. 1, a food chopper employing a blade column according to the present invention is generally designated by reference numeral 10. The food chopper 10 generally includes a receptacle 12, a cover 14, a blade column 16 and a drive mechanism 18 for the blade column 16. The receptacle 12 is in the general shape of a concave bowl with a side wall 19 leading to an upper edge 20, and will receive the food to be chopped, as well as hold the food during chopping and after. The side wall 19 will typically be generally cylindrical or frustoconical (tapering downward) as is known in the art. The cover 14 seals to the upper edge 20 and serves to prevent the food from exiting the receptacle 12 during chopping, yet upon removal of the cover 14 allowing access to the food in the receptacle 12.

Figure 5:
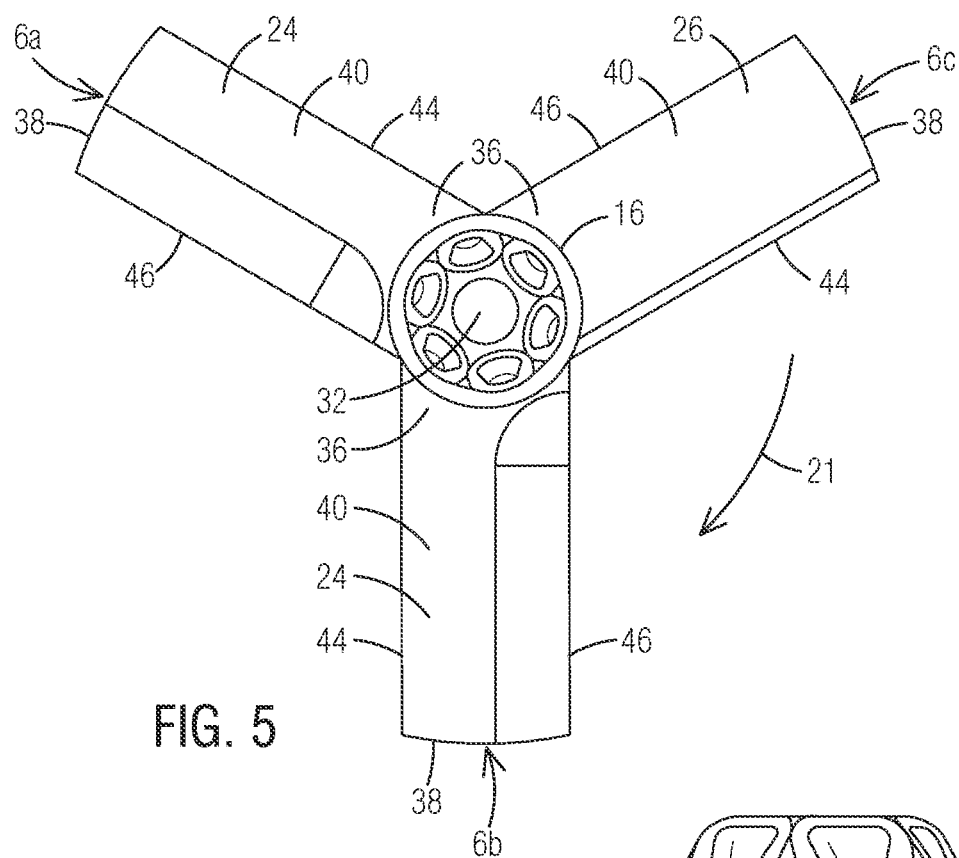
FIG. 5 is a top view of the blade column of FIG. 4.
Figure 7:
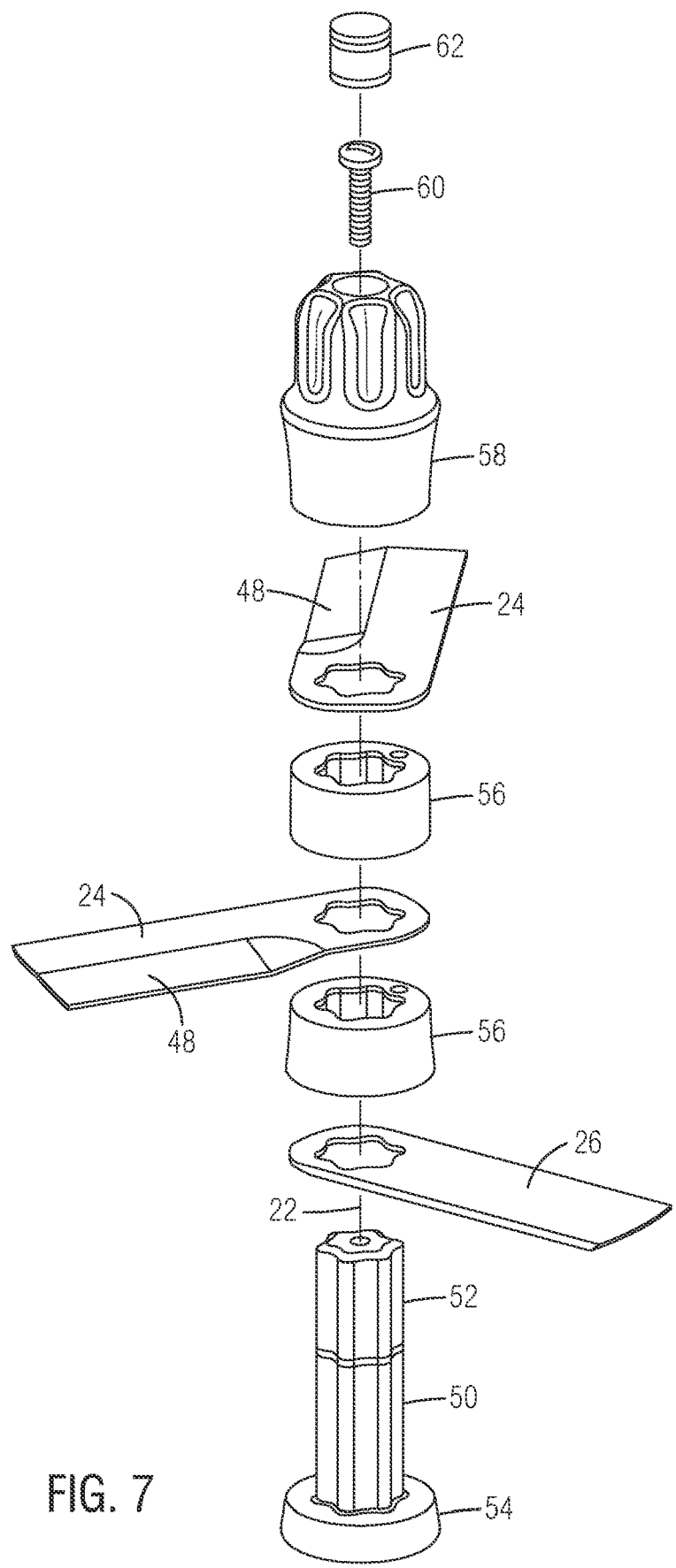
FIG. 7 is an exploded view of the blade column of FIG. 4.

The blade column 16 is received within the receptacle 12 and cover 14 for rotation in a cutting direction 21 (FIG. 5) about longitudinal axis 22 (FIG. 7). The blade column 16 includes at least one upper blade 24 and a single lower blade 26, all extending radially outward from the axis 22, and are equidistant circumferentially spaced, as best illustrated in FIG. 5. In the preferred embodiment shown there are two of the upper blades 24, but different arrangements such as one, three or more upper blades 24 are possible.

The blade column 16 also includes a blade shaft 30 which mounts the blades 24 and 26 in fixed positions. The blade shaft 30 is rigid and elongated along the longitudinal axis 22, with an upper end 32 and lower end 34. The blades 24 and 26 are longitudinally spaced along the blade shaft 30, with this spacing preferably (but not necessarily) equal. Similarly, the lower blade 26 is spaced from the lower end 34 of the blade shaft 30, with this spacing being approximately equal to the desired final size of the chopped food.

The blade shaft 30 will be operatively connected to the drive mechanism 18 such that the drive mechanism 18 will cause the rotation of blade shaft 30 and blades 24 and 26 in the cutting direction 21. Due to the forces involved, this connection will typically be gearing or other similar direct connection. In the embodiment shown, the drive mechanism 18 is a pull cord connected to a one-way drive mechanism (not shown) similar to that shown in U.S. Pat. No. 7,264,189. As such the illustrated embodiment includes an aperture in the lower end 34 of drive shaft 30 to receive a pin extending from the receptacle 12, and the upper end 32 of shaft 30 includes a faceted drive head to be received in a mating socket (not shown) in the cover 14 which is connected to the drive mechanism 18. Other arrangements are possible. The drive mechanism 18 could be located in the cover 14, but be driven by a manual crank or an electric motor. While not shown, it is also known in the art for the drive mechanism 18 to be located below the receptacle 12 and connected to the blade shaft 30 via an aperture (not shown) in the bottom of the receptacle 12.

The blades 24 and 26 each have a radial length which is chosen such that each blade 24 and 26 closely received within the side wall 19 of receptacle 12. Each of the blades 24 and 26 has a generally rectangular form and includes an inner end 36, outer end 38, an upper face 40, lower face 42, and a leading edge 44 and trailing edge 46. As shown in FIG. 5, the leading edge 44 of each blade 24 and 26 is linear, but curved leading edges 44 (and trailing edges 46 if desired) are also possible. For each of the blades 24 and 26 the leading edge will be a cutting edge.

The arrangements described above are well known from manual and electric choppers on the market. The improvements to the blade column 16 according to the present invention will now be described.

A concern with prior art choppers has been the blades causing the chopped food pieces to be propelled within the receptacle 12 and then stick to the underside of cover 14 or an upper portion of side wall 19 out of the reach of the blades and thus not achieving the desired level of chopping without further manual intervention. The present invention addresses this problem. In particular, the blades 24 and 26 are formed to direct the food toward further chopping. This is achieved by the upper blade 24 directing the chopped food downward, while the lower blade 26 directs the food upward.

Figure 4:
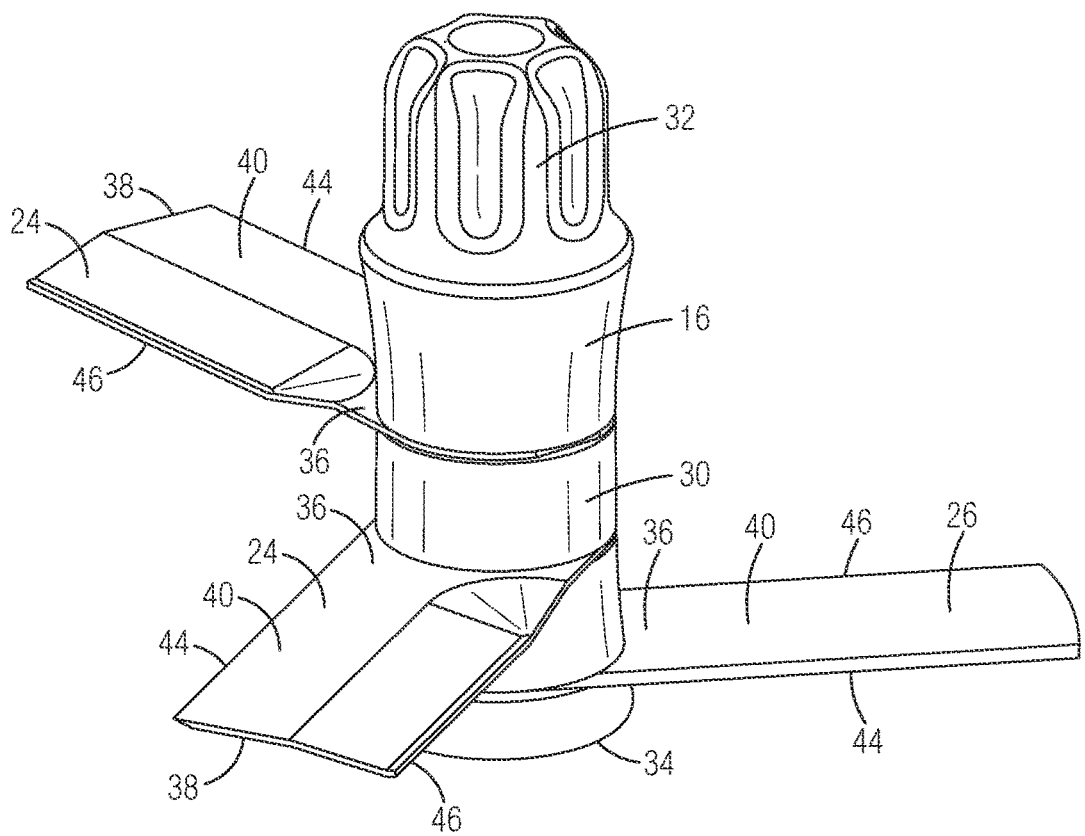
FIG. 4 is a top perspective view of a blade column as in FIG. 2.
Figure 6:
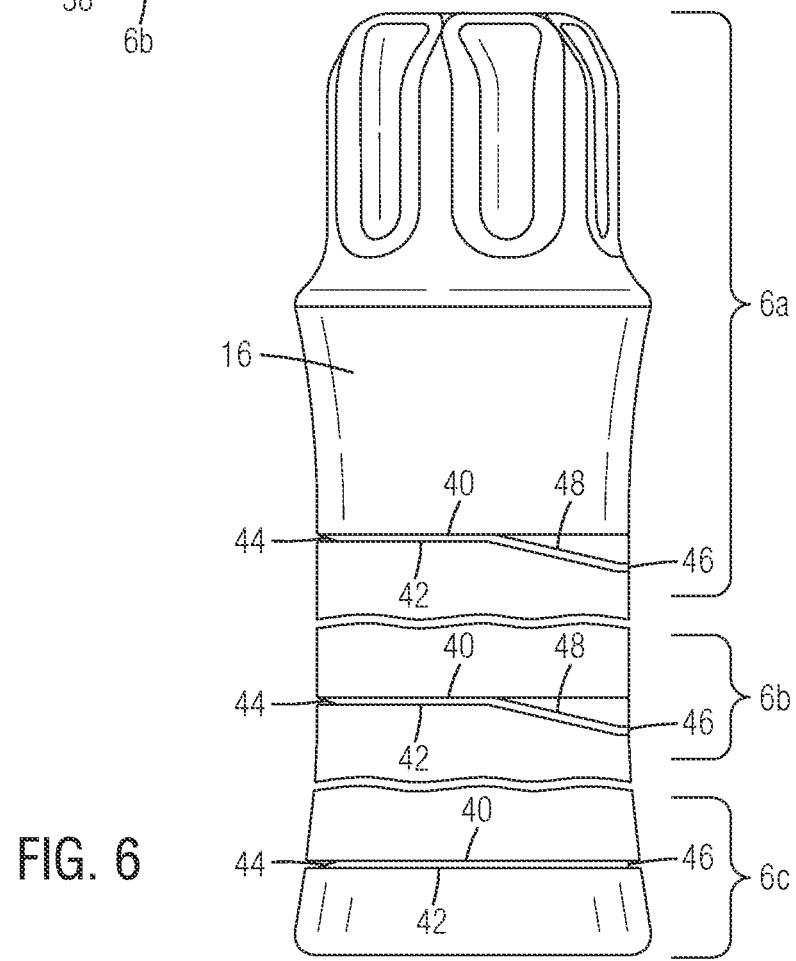
FIG. 6 is a set of detailed sectional views along lines 6a, 6b, and 6c of FIG. 5, illustrating the various blade configurations side by side.

Review of FIGS. 4 thru 6 will show that the leading edge 44 of upper blade 24 includes a single bevel on the lower face 42, while the leading edge 44 of lower blade 26 includes a single bevel on the upper face 40. The bevel is believed to act as a camming surface such that food cut by the lower face 42 bevel on upper blade 24 will be urged or propelled downward; whereas the food cut by the upper face 40 bevel on the lower blade 26 will urged or propelled upward. As such, the food cut by the upper blade 24 will be directed toward the lower blade 26, whereas the food cut by the lower blade 26 will be directed toward the upper blade 24. To further enhance this effect, the trailing edge 46 of each of the one or more upper blades 24 includes a deflector 48 in the form of a portion of blade 24 being angled downward. As may be envisioned, and food particles which are not urged downward by the bevel on the lower face 42 will impinge upon the lower face 42 of the deflector 48 to provide a second chance to urge the food particle downward toward the other blades.

The present invention also includes an innovative structure for the construction of the blade column 16 which is particularly suited for the situation with the drive mechanism 18 in the cover 14. With reference to FIG. 7, the column 16 includes a core 50 elongated in the direction of axis 22. Core 50 includes an elongated drive pin 52 at the upper end, with the drive pin having a non-circular cross-section normal to axis 22. In the embodiment shown, this cross-section takes the form of a hexagon with protrusions at each corner, but other shapes are possible. The core 50 also includes a base 54 stepped outward from the drive pin 52 so as to form a stop against sliding of components along the drive pin 52 as made more clear below.

Each of the upper blades 24 and the lower blade 26 include an aperture in their inner ends 36 with this aperture being shaped to fit upon drive pin 52 with the ability to slide therealong but relative rotation being prevented. As such, it may be seen that the blades 24 and 26 could be assembled to the core 50 by inserting the drive pin 52 into the aperture on the blades 24 and 26 and sliding the blades 24 and 26 into their longitudinal position.

Ensuring the correct longitudinal position of the blades 24 and 26 is first effected by the base 54 which acts as a stop for the lower blade 26. The other positioning is effected by use of one or more spacers 56. Each spacer will have an aperture to receive the drive pin 52. While not required, it is strongly preferred to for the aperture in the spacer with a cross section to closely receive the non-circular drive pin 52 such that spacers 56 are prevented from relative rotation. A spacer 56 is placed onto the drive pin 52 above the lower blade 26, and then the drive pin 52 is inserted into the aperture of the upper blade 24. As may be seen, the spacer 56 will act as a stop for the upper blade 24 fixing its longitudinal position. It is also noted that the angular position of the upper blade 24 is important during this insertion to create the desired circumferential spacing of the blades 24 and 26 (FIG. 5). If more than two blades are to be used, then an additional pairs of spacer 56 and upper blade 24 are assembled to the drive pin 52 as desired. In the preferred form shown with three blades, there are two spacers 56 and two upper blades 24.

The blades 24 and 26 together with the spacer(s) 56 are secured in place by a pin cap 58 secured to the free end of drive pin 52 and closely abutting against the uppermost upper blade 24 to clamp all blades 24, 26 and all spacers 56 between the pin cap 58 and base 54. The pin cap 58 may be secured in position by various means. Typically, the end cap 58 will include an aperture (full or blind) to receive the drive pin 52. The connection between end cap 58 and drive pin 52 could take the form of a threaded connection; adhesive, heat; friction or ultrasonic bonding; or others. In the embodiment shown, the pin cap 58 includes a stepped aperture, the free end of the drive pin 52 includes a threaded hole, and a screw 60 extends through the aperture in the end cap 58 and into the threaded hole of the drive pin 52 to clamp the end cap 58 in place. To avoid ingress of food into the aperture of the end cap 58, a plug 62 is press-fit into the outer end of the aperture in the end cap 58.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A blade column for use in a food chopper comprising a receptacle and a cover, with the blade column held therein for rotation in a cutting direction about a longitudinal axis, said blade column including a blade shaft defining said longitudinal axis; a lower blade cantilevered from said blade shaft; and at least one upper blade cantilevered from said blade shaft and circumferentially spaced from said lower blade; each said upper and lower blade including an upper face and a lower face, as well as a leading edge and a trailing edge defined by said cutting direction, wherein:

each of said at least one upper blade having a cutting edge portion comprising a single bevel on said lower face thereof defining a cutting edge on said leading edge and having a deflector portion opposite said cutting edge portion, wherein said deflector portion defines said trailing edge and comprises a deflector that extends along the radial length thereof and that extends from a first portion to said trailing edge at an angle oriented downward away from the cutting edge; and said lower blade having a single bevel on said upper face thereof defining a cutting edge on said leading edge.

2. A blade column as in claim 1, wherein said at least one upper blade comprises a first upper cutting blade and a second upper cutting blade.

3. A blade column as in claim 1, wherein said blade shaft comprises: a core comprising an elongated drive pin and a base extending radially from a bottom end of said drive pin, said drive pin having a non-circular cross-section normal to said longitudinal axis; one or more spacers; and a pin cap secured to a free end of said drive pin, such that said lower blade is secured between said base and said one or more spacers, and said upper blade is secured between said one or more spacers and said pin cap.

4. A blade column as in claim 3, wherein said at least one upper blade comprises two upper cutting blades.

* * * * *